March 28, 1961     R. H. SCHONING     2,976,620
TESTING AND SCORING DEVICE

Filed Sept. 30, 1957     2 Sheets-Sheet 1

*Fig. 1.*

INVENTOR.
Richard H. Schoning
BY
ATTORNEYS

March 28, 1961  R. H. SCHONING  2,976,620
TESTING AND SCORING DEVICE
Filed Sept. 30, 1957  2 Sheets-Sheet 2

Fig.2.

INVENTOR.
Richard H. Schoning
BY
ATTORNEYS

United States Patent Office 2,976,620
Patented Mar. 28, 1961

2,976,620

TESTING AND SCORING DEVICE

Richard H. Schoning, United States Army

Filed Sept. 30, 1957, Ser. No. 687,305

2 Claims. (Cl. 35—9)

(Granted under Title 35, U.S. Code (1952), sec. 266)

The invention described herein may be manufactured and used by or for the Government for governmental purposes without the payment of any royalty thereon.

This invention relates to improvements in the art of answer recorders of multiple choice type, objective type items, educational tests or other suitable test devices.

At present there are conventional types of test devices in use which are restricted by their limited number of possible test answers which utilize a plurality of complemental test forms for a test, and have the further disadvantage of requiring the use during the test of a special pencil having a lead of suitable size which has electric conductive properties for designating and recording the correct answer to each question on a test form.

The instant invention pertains to an all purpose answer sheet suitable for any objective test which, it is believed, provides by its unique combination of the features of certain present devices, an instrument for testing which is much more efficient and economical than any current test device in terms of cost, and in unique results gained from its utilization.

This invention relates more specifically to a training-tester adaptable for any particular test booklet, key or situation problem. This tester is unique in that it is composed of a single sheet-like test form of suitable material on which is printed a desired orientation of test symbols of a suitable size in sensitized ink having electric conductive properties and covered with an opaque, inert, and easily erasable material. During a test, the trainee chooses his answer by erasing with an eraser the inert material from over a selected position on the form until a proper answer is found. By this method of use any erroneous trial erasures may be calculated in each trial answer of the score of the test and manually recorded on the right hand margin of this form in a boxed-in answer square or space designated as "number of erasures" as the test proceeds. At the conclusion of the test the total number of test erasures made during the test may be manually or machine calculated and totaled to determine the trainee's final resulting score of the test.

This test device provides a new combination and method of answer recorder, a greater choice of test symbols or permutation of choices for answers printed on a single base test form in sensitized electrical conducting ink beneath an opaque and inert covering of erasing material which may be easily uncovered by being rubbed with a pencil eraser after which the trainee's examination score may be machine calculated to quickly test the trainee's aptitude.

Use of this new test form permits stockage in large quantities sufficient for long-term overall demands, suitable for many and varied constituent elements of such overall demands, meanwhile being so completely responsive to changes in particular requirements that there need be no waste of the form whatever, other than that of test forms actually consumed in use. The use of this test device may be illustrated, as for example: Prior to a test the instructor will announce to those taking the test that, "questions 1-45, the correct solution is indicated by a circle (○), while the correct solution to test questions 46-75 is indicated by symbol (#)." Students or testees take the test, searching by erasures until all correct symbol responses are revealed. Following the test, the symbol key and all unused solution sheets are collected, accounted for, and returned to stockage control. The variety of keys available with a single test form makes compromise a negligible problem while it simultaneously effects tremendous economies in design, manufacture, packaging and distribution, and in stockage and utilization.

The record material of this device or test form, if desired, may be self-scored or scored by a test-scoring machine which operates in terms of electrical contacts. The uncovered sensitized printed answers of appropriate size on the answer sheet formed with electrographic or electrical conducting ink, establish contact across a set of contact brushes in the machine. The electrical contacts are counted by the scoring machine and the total thus obtained represents the test subject's score. The exposed printed answers on the base material are uniform in size and have a uniformity of electrical contact insuring accurate test scoring test results. Similarly, this answer device has the additional advantage that stray, unintentional sensitized marks may not be counted as wrong test responses by the electrical calculating machine.

This new type of test device insures a uniformity of testing conditions which may be used as an objective and standardized measure of human behavior, in connection with instruction, education, gaming devices, self-training methods and programs for measuring or testing the knowledge of individuals wherein the correct answers to certain prepared questions are indicated by novel methods of instruction in component location and trouble-shooting in complicated equipment, whereby the need for verbal or written answers is eliminated. This device may be used for self-grading on the honor system; for student interchange visual grading; for teacher grading visually, with or without template, and permits construction of a wide variety of tests to fit a universal form rather than requiring the special construction of a unique test form to fit a particular test. This test form may be used with self-tutoring tests and standardized answer keys.

The ultimate discriminative power of this new test form or device is greatly increased over that of methods of presently known test devices. The instant device or test form has capabilities distinctly superior to test forms now in common use in schools. For example, with 90 test items, a present type of test form presents a potential discriminative spread from 0 (student selects all answers incorrectly) to 90 (student selects all answers correctly). In such a case, the discriminative potential may be expressed simply as 90, since there are 90 different raw scores that can be achieved. The ultimate discriminative power of 90 of one present type of test form same type of test and number of test subjects (90) is 270 which is a great increase over that of the ultimate discriminative power of 90 of one percent type of test form in use. The columns of answer symbols of this device are integrated or interrelated both horizontally and vertically between the left and right edges of the device to give greater flexibility of use, adaptability to complicated problem situations and greater resolving and ultimate discriminative power as a multi-purpose study, testing and training device.

A primary object of this invention is the provision of a card or the like upon which has been printed answers or selected indicia to a plurality of questions taken from a key manual, after which the card is overprinted with inert erasable material in such a manner that the answers are incapable of observation until uncovered during the test.

A further object of the present invention is to provide an examination scoring device which may be used as an all-purpose answer sheet for any objective or educational test.

Another object of the present invention is to provide an examination scoring device which provides separate test solution sheets and/or critiques which may be provided at a later date to inform those tested with respect to errors made.

A further object of this invention is to provide an examination scoring form or device which does not require the use of an electrographic pencil.

A still further object of this invention is to provide an examination scoring form which permits non-verbal testing of examinees capable of recognizing basic universal symbols, and of understanding instructions concerning erasures.

One of the objects of this invention is to provide a device for recording the mental responses to a plurality of questions given orally or taken from a test key or guide booklet.

It is a further object of this invention to provide a quiz game, the operation of which may be quickly mastered from mere examination of the device by comparison with accompanying general instructions.

Another object of the invention is to provide a device of the kind described, which is of simple construction enabling production at low cost, which has an entertaining and instructive value, and which is useful in determining the ability, aptitude, knowledge, and observance of the person using the device.

It is an object of this invention to provide a convenient device for quizzing or testing the knowledge of individuals wherein the correct answers to certain prepared questions are indicated by novel means, the need for verbal or written answers being eliminated.

Another object of this invention is to provide an examination scoring device that provides at least a potential of approximately 4096 different, 100 percent solution patterns (for single-answer, 4 response, multiple-choice items), each consisting of easily recognized universal symbols.

A still further object of this invention is to provide a universal examination form which permits stockage or storage in large quantities of the form sufficient for long-term overall demands suitable for many and varied constituent elements of such overall demand, meanwhile being so completely responsive to changes in particular requirements that there need be no wastage of the supply of examination forms whatsoever, other than that of forms used as a result of the test.

A further object of the present invention is to provide an examination scoring form which may be used for self-grading on the honor system; for student inter-change visual grading; and for teacher or student interchange whereby the grading is performed visually, with or without template and which is capable of being machine processed as to answer results and desired information.

Another object of this invention is to provide an examination scoring device which eliminates delay in student-teacher cognition of error and eliminates the compound error problem.

A still further object of this invention is to provide an examination scoring form which provides elimination of stray marks, marks too lightly made or other criteria which give false results in machine calculating and processing.

Another object of the present invention is to provide an examination scoring form which is capable of being printed with a sensitized ink which will register when forms are machine processed by test scoring equipment.

With these and other objects in view, the invention includes certain novel features, preferred forms or embodiments of which are hereinafter described with reference to the drawings which accompany and form a part of this specification.

In the drawings—

Fig. 1 is a format of the preferred form embodying the features of the instant invention; and Fig. 2 is a format of another form embodying the features of the instant invention.

Referring now to the drawings and more particularly to Fig. 1, which illustrates the preferred form of this invention, which preferably consists of a relatively stiff sheet or board of suitable base material 1 upon which symbols 2, 5, 6, and 7 to each of the test items or questions of the test are prearranged and numerically arranged in a grid, matrix, or other desired orientation pattern and printed in sensitized electrographic ink upon base material 1 as shown and illustrated in Fig. 1, line (1) and the random character distribution table hereinafter shown. Fig. 1, as illustrated, shows a left edge containing identification data, raw scores, grade and serial number while the right edge of this device discloses a column for answers or number of trial erasures and utilizes a basic grid pattern or arrangement for answer responses for a 90-item test. However, it is to be understood that this invention may be adapted for a test comprising a larger or smaller number of test items and is not restricted to a 90-question test. Each arrangement of the selectable indicia or symbols 2, 5, 6, and 7 is printed in discrete or predetermined answer areas on base material 1, corresponding to its respective test question or item which is over-printed by a circular shaped covering of suitable inert material 3 which may be easily erased and may be of a suitable color. However, it is to be understood that the overprinting material 3 is not restricted to a circular configuration, but may be of any suitable configuration. The number of trial erasures made for each test item by a testee is entered in its respective erasure space 8. The total number of trial erasures, including correct trial erasures and incorrect trial erasures of the inert and opaque material 3 by testee is manually entered as evaluation indicia in total space 9 and the total number of such trial erasures for the test is used in reckoning or calculating the standard grade score of testee and grade in percent in appropriate spaces opposite the "Raw Scores" designated at the heading of this test form. By the use of symbols such as, by illustration, asterisk 5, symbol (#) as at 7, triangle 2, or circle 6, a greater choice of test symbols or permutation of test answers are available for a desired test. Each answer for each test item is made up of a suitable number of differing symbols designated by reference numerals 2, 5, 6, and 7 having a random distribution in the answer areas of the base material 1 of which the following is an example wherein the frequency of occurrence of each of the chosen symbols used in a 90-item test may be as shown in the groupings of symbol frequencies, that is, (#) occurs 18 times, (○) occurs 24 times, (Δ) occurs 25 times, and (*) occurs 23 times in 90 items as shown in the following table of answer symbols:

swer columns designated as A, B, C, and D, each of which has its corresponding raw score to assist in evaluating the testee's final grade score after a test is taken. However, it is to be understood that the number of items or answer

*Random distribution of answer symbols*

| | A | B | C | D | | A | B | C | D | | A | C | B | D | | A | B | C | D |
|---|---|---|---|---|---|---|---|---|---|---|---|---|---|---|---|---|---|---|---|
| 1 | Δ | * | ○ | # | 24 | * | Δ | ○ | # | 46 | # | ○ | * | Δ | 68 | Δ | ○ | # | * |
| 2 | Δ | ○ | # | * | 25 | Δ | # | * | ○ | 47 | Δ | ○ | # | * | 69 | ○ | # | Δ | * |
| 3 | # | * | Δ | ○ | 26 | ○ | * | # | Δ | 48 | ○ | Δ | # | * | 70 | Δ | ○ | * | Δ |
| 4 | # | Δ | ○ | * | 27 | * | ○ | # | Δ | 49 | ○ | Δ | # | ○ | 71 | Δ | ○ | # | * |
| 5 | Δ | ○ | # | * | 28 | * | Δ | # | ○ | 50 | Δ | * | # | ○ | 72 | # | ○ | * | Δ |
| 6 | * | # | Δ | ○ | 29 | Δ | * | ○ | # | 51 | # | ○ | Δ | * | 73 | * | # | Δ | ○ |
| 7 | ○ | * | Δ | # | 30 | * | ○ | Δ | # | 52 | # | Δ | ○ | * | 74 | # | ○ | Δ | * |
| 8 | * | Δ | # | ○ | 31 | * | ○ | # | Δ | 53 | # | * | Δ | ○ | 75 | * | ○ | Δ | # |
| 9 | * | Δ | # | ○ | 32 | Δ | * | ○ | # | 54 | * | Δ | ○ | # | 76 | * | Δ | ○ | # |
| 10 | # | Δ | ○ | * | 33 | * | # | ○ | Δ | 55 | ○ | # | Δ | * | 77 | ○ | * | # | Δ |
| 11 | * | Δ | ○ | # | 34 | # | Δ | * | ○ | 56 | Δ | * | # | ○ | 78 | Δ | # | ○ | # |
| 12 | # | Δ | * | ○ | 35 | Δ | # | ○ | * | 57 | * | # | Δ | ○ | 79 | ○ | Δ | * | # |
| 13 | Δ | ○ | # | * | 36 | * | # | ○ | Δ | 58 | Δ | ○ | # | Δ | 80 | Δ | * | # | Δ |
| 14 | Δ | ○ | * | # | 37 | Δ | * | Δ | # | 59 | # | * | ○ | Δ | 81 | ○ | # | ○ | Δ |
| 15 | ○ | * | # | Δ | 38 | ○ | # | * | ○ | 60 | ○ | Δ | * | # | 82 | # | ○ | Δ | * |
| 16 | * | # | Δ | ○ | 39 | # | Δ | ○ | * | 61 | ○ | # | Δ | * | 83 | * | ○ | # | Δ |
| 17 | Δ | * | # | ○ | 40 | # | ○ | Δ | * | 62 | * | ○ | # | Δ | 84 | Δ | ○ | * | # |
| 18 | # | * | Δ | ○ | 41 | Δ | ○ | # | * | 63 | ○ | # | Δ | * | 85 | ○ | Δ | * | # |
| 19 | # | Δ | ○ | * | 42 | ○ | * | # | Δ | 64 | ○ | Δ | # | * | 86 | * | ○ | Δ | # |
| 20 | # | ○ | Δ | * | 43 | * | Δ | # | ○ | 65 | ○ | * | Δ | # | 87 | # | ○ | Δ | * |
| 21 | * | # | Δ | ○ | 44 | # | * | Δ | ○ | 66 | Δ | # | * | ○ | 88 | Δ | * | ○ | # |
| 22 | * | Δ | ○ | # | 45 | * | # | Δ | ○ | 67 | # | Δ | ○ | * | 89 | * | # | Δ | ○ |
| 23 | # | Δ | * | ○ | | | | | | | | | | | 90 | Δ | ○ | * | # |

Fig. 2 illustrates another embodiment of the invention which consists of a main base or sheet-like member 11 of suitable material upon which is printed in electrographic ink answer symbols 12 of a suitable size in a matrix or other suitable pattern as disclosed. The answer symbol 12 of test item 7, as shown, was originally overprinted by opaque inert and easily erasable suitable material 13 and erased by testee during a test to uncover the answer symbol whereby the number of trial erasures including erroneous erasure for symbol 14a is counted in a testee's score in uncovering the correct answer symbol for a test question. Outline symbols 14 designate symbols for a vacant area or wrong choice by testee which are uncovered by erroneous trial erasures. Each answer item for a 90-item test is arranged in numerical order as desired by a predetermined random selection.

During the progress of the test, the testee enters in windows 15 the number of trial erasures for each test item. Upon completion of the test, the testee may manually total or sum all erasures made during the test by testee and enter the total number of erasures (including erroneous trial erasures) opposite the notation entitled "Total erasures" as at 17. The total number of trial erasures including correct trial erasures and incorrect trial erasures of the inert and opaque material 13 is used in reckoning the standard grade score and grade in percent in appropriate spaces opposite the "Raw Scores."

This test device, as illustrated by Figs. 1 and 2, is very versatile and may be adapted to be suitable for many types of tests by the instructor or test administrator. The answer symbols or marks for each test question may be prearranged in the matrix pattern as shown by any suitable or desired random distribution of answer symbols with any suitable distribution of symbol frequencies under each test item designation headed by letters A, B, C, and D, as shown. Fig. 2 provides an examination scoring form which has erasable overprinting 13, with breaks in the vertical columns to separate each group of test items. In Fig. 2, reference numerals 12a of test items 35 and 37 designates answer or key symbols in scorable positions on this embodiment of the invention before the answer symbols are overprinted by inert erasable material 13. Test item 7 illustrates a test error by testee in which reference numeral 12 designates a correct erasure or answer choice, while reference numeral 14a illustrates an erroneous trial erasure or answer choice.

Figs. 1 and 2 of this invention show a plurality of answer columns are not restricted to four columns but may comprise any suitable number of answer columns, each of which may have its respective raw score for use in determining a testee's final score for a given test.

The test results of both Figs. 1 and 2 may be manually calculated or may be machine calculated at any desired time, using such part of the test information as desired.

While there has been described what is at present considered to be the preferred embodiments of this invention, it will be obvious to those skilled in the art that various changes and modifications may be made therein without departing from the invention.

Having thus described my invention, what I claim as new and wish to secure by Letters Patent is:

1. A unitary testing and scoring device comprising a base sheet having a plurality of vertically and horizontally disposed predetermined areas, a series of said predetermined areas corresponding to a single test item, a plurality of randomly distributed symbols, said symbols being printed in electrically conductive ink, one of said plurality of symbols in one of a preselected number of said predetermined areas, an inert, erasable material overlaying each of said predetermined areas and joining groups of said predetermined areas to form a continuous strip, a plurality of defined areas on said base sheet removed from said predetermined areas, said defined areas correlated with said predetermined areas for recording attempted trials to select a correct answer by removal of said erasable material, indicia means in at least one corner of said base sheet for determining testee's total test score, and a preselected portion of said base sheet removed from said predetermined and defined areas for recording test data.

2. A unitary testing and scoring device comprising a base sheet having predetermined areas arranged in selected patterns, a series of said predetermined areas corresponding to a single test item, a symbol composed of electrically conductive material disposed in a selected number of said predetermined areas, an inert, erasable material overlaying each of said predetermined areas, said symbols composed of electrically conductive material being exposed upon erasure of said inert, erasable material, a plurality of defined areas on said base sheet removed from said predetermined areas for recording attempted trials to select a correct answer for each test item by removal of said erasable material, indicia means in at least one corner of said base sheet for determining testee's total test score, and a preselected portion on said base sheet removed from said predetermined and said defined areas for recording test data.

References Cited in the file of this patent

UNITED STATES PATENTS

| | | |
|---|---|---|
| 1,883,775 | Finkenbinder | Oct. 18, 1932 |
| 2,052,369 | Toops | Aug. 25, 1936 |
| 2,095,111 | Triolo | Oct. 5, 1937 |
| 2,525,837 | Simplair | Oct. 17, 1950 |
| 2,614,338 | Clark | Oct. 21, 1952 |
| 2,618,866 | Adams | Nov. 25, 1952 |
| 2,764,821 | Buitenkant | Oct. 2, 1956 |